March 3, 1964
D. K. CRAMPTON
3,123,466
CONVERSION OF BRASS CHIPS
Filed Sept. 23, 1960
4 Sheets-Sheet 1
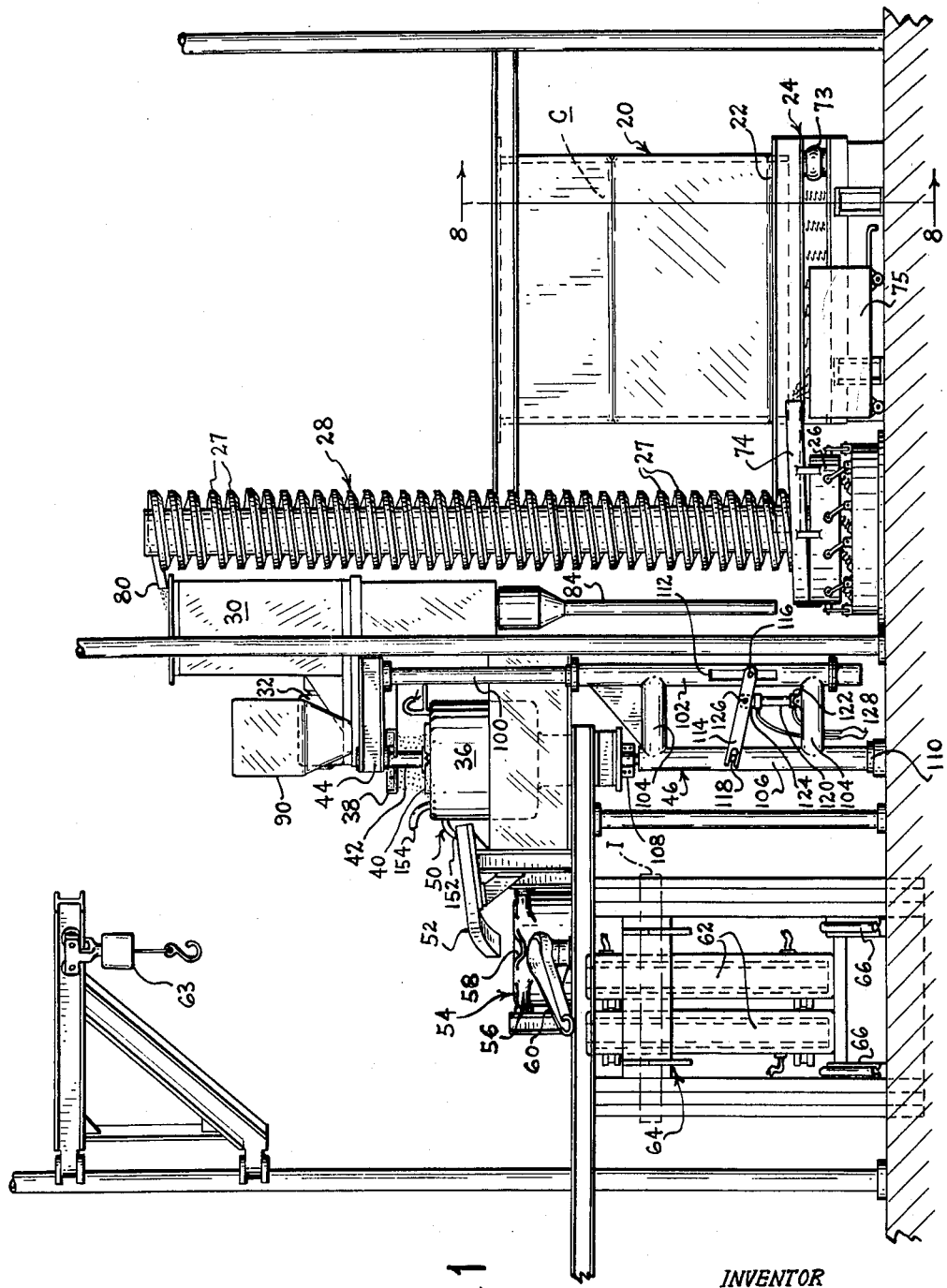
INVENTOR
DONALD K. CRAMPTON
BY
Steward + Steward
his ATTORNEYS

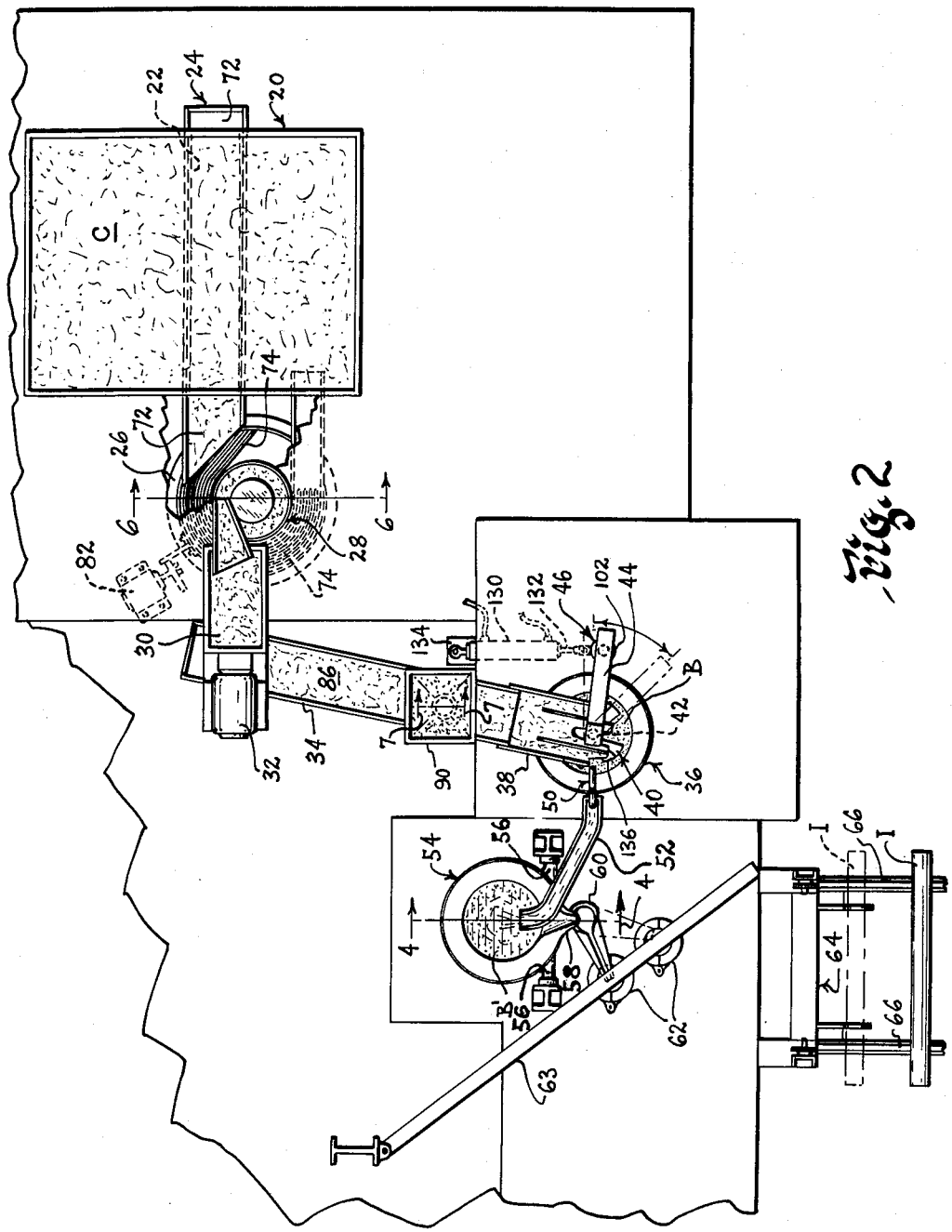

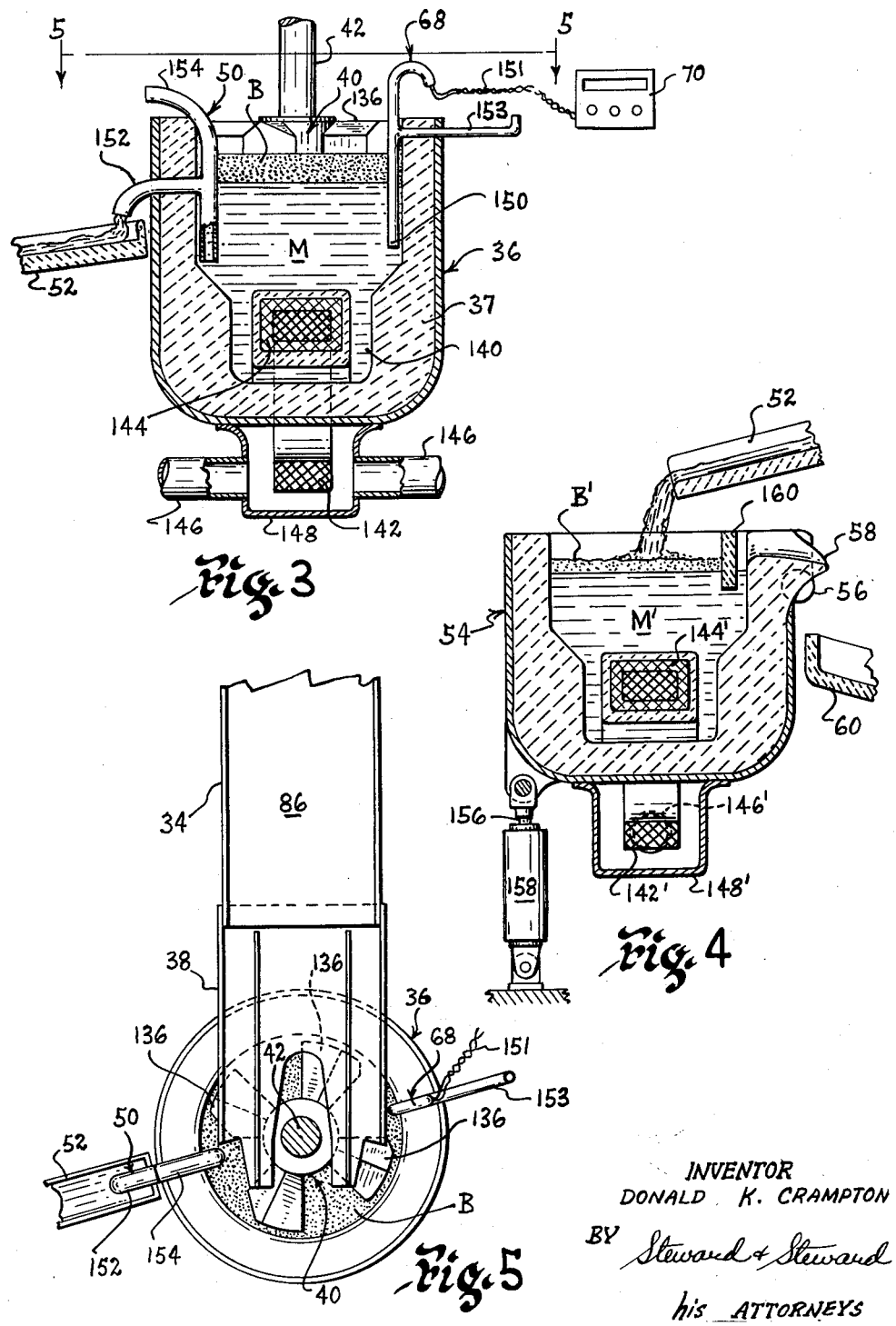

March 3, 1964  D. K. CRAMPTON  3,123,466
CONVERSION OF BRASS CHIPS
Filed Sept. 23, 1960  4 Sheets-Sheet 4

INVENTOR
DONALD K. CRAMPTON
BY Steward + Steward
his ATTORNEYS

United States Patent Office 3,123,466
Patented Mar. 3, 1964

3,123,466
CONVERSION OF BRASS CHIPS
Donald K. Crampton, Marion, Conn., assignor to Chase Brass & Copper Co., Incorporated, Waterbury, Conn., a corporation of Connecticut
Filed Sept. 23, 1960, Ser. No. 58,056
11 Claims. (Cl. 75—65)

The present invention relates to conversion of scrap metal of small particle size by melting and casting the scrap into pigs, ingots or billets in order to recover the metal in a form that can be used practically. More particularly, the invention is concerned with a practical and economical method of converting to usable billet form large quantities of fine brass chips, shavings, turnings, borings and similar small particle scrap resulting from ordinary machining operations. The invention is of most immediate importance in the conversion of free-cutting brass chip scrap of which there is normally a very large amount available but which in the past has not been readily utilizable.

As used herein, the term "chips" is employed to designate the smaller, lighter scrap metal particles resulting from machining metal stock, rather than the heavier type of scrap comprising chunks of rod, bar, tube, pieces of castings or other fabricated metal shapes. Generally speaking, this heavier scrap can be remelted in a furnace without too much difficulty because the individual pieces of scrap have substantial weight for their size, that is their specific surface-to-weight ratio is relatively low. This is not true of the fine chips with which this invention is more especially concerned where the surface-to-weight ratio, both of the individual particles and of the aggregate formed thereof, is of a much higher order. This lighter form of chip is composed of particles of non-uniform, highly random individual sizes and shapes, but prevailingly is characterized by being relatively thin and long in proportion to thickness and in having a tendency to curl. Perhaps the majority of the particles can best be described as curved platelets of up to about 0.010 inch thickness and from one-quarter to one-half inch in length along a maximum dimension, although a minor proportion of almost dustlike fines and another of long, stringy slivers are also present. This type of chip in the aggregate is extremely difficult to melt in a furnace, as will be discussed in more detail presently. This difficulty is so well recognized in industry that care is taken to separate it from the heavier, chunkier type of scrap. In fact it sells at a substantially lower price than does the heavier scrap for this very reason.

The invention here disclosed makes it possible to charge scrap melting furnaces with 100% chip scrap which has heretofore not been practical or economical in spite of numerous attempts. The invention, although concerned more especially with the handling of chip scrap, provides certain advantages in reclaiming heavier scrap also, either by itself or in admixture with chip scrap, and this is accordingly not excluded.

The practical recovery in usable form of fine metal chips is an old problem of long standing in the art, and a great many proposals for solving it have been advanced over the years. It has long been recognized that the difficulty is due largely to three factors:

(1) The surface oxidation of the chips, particularly under the elevated temperatures and in the presence of air, water vapor, etc., obtaining in the zone in which the chips are introduced into the furnace, inhibits ready acceptance of the chips into the molten mass and in addition produces excessive dross;

(2) The light weight of the particles further tends to cause them to float on or mix with the drossy layer on the surface of a melt rather than sink into and be absorbed by the melt, and (3) In the conventional melting, chips are not fed at a continuous, steady rate conforming to the rate at which they can be melted by the energy input of the furnace. Instead, they are usually added all at once at the start of a heat or at least in relatively large increments with the result that they heat up over a protracted period of time and in a strongly oxidizing atmosphere. Even when they attain or definitely exceed the melting temperature, a substantial portion of them simply ball up or spheroidize with an intact oxide coating which effectively prevents wetting by and assimilation into the bath. The net result is a very large loss in the form of skimmings which are usually removed after each heat.

The rapid and extensive oxidation of the chips when attempt is made to introduced them into a melting furnace in the way heavier chunk scrap is ordinarily fed of course leads to the formation of a high percentage of dross or slag, with concomitant loss of metal values in reclaiming the scrap. Such losses commonly run from 5% to 8% of the metal introduced where 100% chip charges to the furnace have been tried in the past. Because of the very large tonnage of chip scrap available for conversion, losses of this order become a highly significant factor since they may represent several tens of thousands of dollars annually in a large casting shop.

In an earlier Patent No. 2,446,637 in which I am a joint inventor there is disclosed a method of converting brass chips involving the use of an enclosed melting furnace and the supply thereto of a reducing gas mixture to maintain a nonoxidizing atmosphere through which the chip scrap is dropped into the melt. While this method has been used, the necessity for enclosing the furnace and supplying a special reducing gas thereto has practical commercial disadvantages.

It has also been common practice in the past to attempt to reduce oxidation losses by mixing a smaller portion of chip scrap with a substantially larger portion of heavier chunk scrap, and this method is probably still used predominantly in casting shops today where larger quantities of chips are melted. The large chunk scrap in this system together with manual stirring of the melt in the furnace, is relied upon to carry the fines into the melt and this does occur to a limited degree. This permits some utilization of the fine scrap but metal losses are not significantly reduced and the method is subject to the definite limitation that the amount of fine scrap that can be utilized is restricted by the availability of the heavier chunk scrap.

Another scheme that has been proposed is that of briquetting or compacting into block form by heavy pressure quantities of fine chip scrap and then introducing the briquette into the furnace. Experience with this, however, has shown that while this is an aid in the handling or introducing of the chips into the furnace, it does not materially improve the situation in respect to getting rapid melting. In practice, increasing difficulty of melting the briquettes with succeeding charges in a furnace is encountered, requiring more rabbling or puddling by the caster. There is a concomitant increase in slag on the melt requiring more frequent skimmings and resulting in lower metal recovery with each succeeding round. Also unless the briquettes are made at extraordinarily high pressures and thus have unusually high density, they are prone to disintegrate during heating, thus in effect reverting to loose chips with attendant poor melting performance.

It will be appreciated also that this fine scrap is usually saturated with cutting oil which adheres to the chips, even in the briquetted form, and the vaporization of the oil when the chips or briquettes are introduced into the furnace produces such volumes of smoke and flame that it soon becomes quite unbearable for the operator or caster to stand near enough to the furnace to enable him effectively to push the scrap under the surface of the melt and to skim the slag or dross therefrom. Generally it is at least necessary to pay bonus rates to get workmen to accept such a job. Schemes have been devised for mechanically actuating a rabble for effecting this pushing or puddling, and other devices proposed to mechanize the skimming operations, so that a caster is relieved to some extent from exposure to the intense heat and large volumes of soot and smoke. So far, however, these prior schemes have been only moderately successful under the most favorable conditions, and these do not ordinarily obtain in practice.

There are other disadvantageous side effects encountered in the prior practice of handling fine metal chips, such as widely variable energy input to the melting furnace resulting in lower over-all operating efficiency. Furthermore, due to the oxidizing conditions and to the wide variation in molten metal level arising from tilting a furnace to pour off the molten metal, which has been the usual practice, slag incrustations are caused to build up on the side wall of the crucible, reducing its holding capacity and necessitating that the furnace be tilted farther over in order to pour a full mold. In normal use, portions of these incrustations often break loose and work down into the inductor channels of the furnace, causing them to clog and overheat. In order to keep the furnace in good condition, it is necessary and customary to chip or clean off these incrustations and to ram the channels about once a day. This is a hot, dirty, time-consuming job.

It is accordingly the broad objective of this invention to make practical on an industrial scale the handling and melting of large volumes of fine chip scrap metal for the economical recovery therefrom of the metal content in commercially usable form. The method of accomplishing this which is hereinafter described achieves a number of important correlated objectives in this art of melting chip scrap, including increased efficiency in furnace operation both from the standpoint of energy input and operating life of the furnace through reduction of thermal stresses caused by wide fluctuations in furnace temperature and reduction or elimination of furnace wall accretions, reduction of metal losses through reduction or elimination of the need for skimming, thereby resulting in increased total yield, and increase in rate of production per furnace hour and per man hour, thus effecting a reduction in cost of operation.

By way of comparison between the results obtained in melting brass chips in the previously conventional manner and the method of the present invention, recent operation of the method as described herein using 100% chip charges throughout has now been accomplished without encountering any incrustations on the crucible wall of the furnace and without the necessity of even once chipping the furnace or ramming the channels. And whereas skimming losses in 100% chip melting operations previously tried easily run from 5% to 8% of the metal charged into the melt furnace, operation under the method here described on a test run of thousands of pounds of brass chips produced a total of skimmings from the melt surface of less than 0.7%.

In order to accomplish these results, certain prerequisites are essential. Briefly stated, the novel method here disclosed comprises maintaining a body of metal in molten condition in the crucible of a melt furnace and providing across the surface of that metal a continuous, thick, highly fluid layer of finely divided carbonaceous material to form on and above the surface of the molten metal a protective blanket constituting an atmospheric zone highly reducing in nature and offering minimum resistance to the penetration of metal chips therethrough. The characteristics of this carbonaceous blanket are important and more will be said about this presently. Quite as important as providing the proper carbonaceous blanket on the melt is the need for introducing the chips as uniformly as practical into this blanket and in such manner that they are received therein below oxidation temperature, and then effectively commingling the chips with the blanket to get intimate contact by puddling or poking action under nonoxidizing conditions while they are heated to the melting point through such contact. In addition it is quite essential that the rate of chip feed to the furnace be carefully controlled to approximate the momentary or instantaneous capacity of the furnace to melt chips, as determined by the net effective energy input to the furnace. It is also practically essential to use a bottom feed overflow device in the melting furnace to obviate the necessity of tilting that furnace in order that a substantially constant level of molten metal may be maintained concurrently with withdrawal of metal to a holding or pouring furnace. This bottom feed overflow arrangement serves also to prevent unmelted chips from being discharged but even more importantly it, together with the special carbonaceous blanket and poking means elsewhere described, assures that any small particles or iron or steel (always present as contaminants in such chips even after running over a magnetic separator) are dissolved in the bath rather than being mechanically occluded as discreet particles in the cast billet. This is of profound importance in machining of rod made from billets of reclaimed metal.

With regard to the character and composition of the covering blanket on the surface of the melt, ordinary charcoal or other relatively coarse carbonaceous material might be used but the efficiency of the blanket is markedly improved by using a very fine particle size material. Charcoal or other coarse material does not provide the fluidity or result in as completely intimate contact with individual chips as is desired for optimum results. I have found that a product which is made by burning natural gas in a neutral or oxygen-deficient atmosphere is excellent. While the ultimate particles are considerably less than one micron in size, they are commercially produced in the form of agglomerated spherical particles up to about $\tfrac{1}{32}''$ in diameter. These give a particularly fluid bed, enhancing the rapid and complete commingling of the chips under the action of the poking mechanism described. And as already mentioned, this blanket is utilized to protect the chips from significant surface oxidation as they are introduced into the furnace and while they are being raised to the melting point. For this purpose a blanket of very substantial thickness is required.

In order that the invention may be better understood, reference is made to the accompanying drawings illustrating a typical installation suitable for practicing the novel method. In the drawings FIG. 1 is a side elevational view of chip processing apparatus for carrying out the inventive method, including a chip storage bin, conveyors for transferring the chips to a melting furnace, agitating or pusher means cooperating with the melt furnace to assist in getting the chips into the body of molten metal in the furnace crucible, an auxiliary holding or pouring furnace, billet molds and miscellaneous equipment for coordinating the over-all operation;

FIG. 2 is a view in plan of the installation shown in FIG. 1;

FIG. 3 is a cross-sectional view through the melt furnace showing the carbonaceous blanket on the surface of the molten metal, the pusher head in greater detail and arrangements for effecting underpouring of the metal and for mounting a temperature sensitive element in the body of the melt;

FIG. 4 is a view, partly in section, through the holding furnace showing the tilting arrangement therefor;

FIG. 5 is a plan view, taken on line 5—5 of FIG. 3, of an arrangement for effecting distribution of the chips across the projected surface of the metal in the melt furnace;

Figure 6:
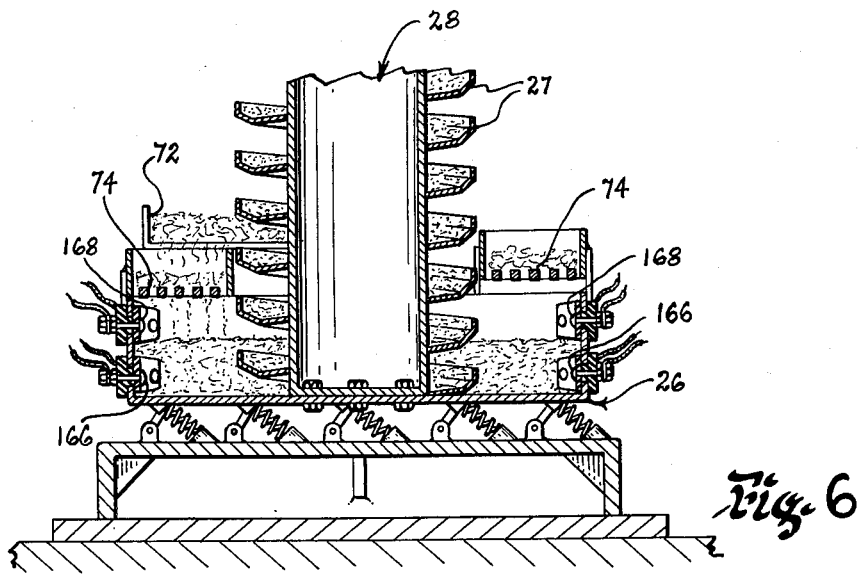
FIG. 6 is a fragmentary view of a portion of the conveyor system used to move chips from the storage bin toward the melt furnace.

It will be helpful first to consider in outline the several operational steps involved in carrying out the method of the invention as it pertains to the particular apparatus shown in the drawings. Referring to these drawings, and more particularly to FIGS. 1 and 2 thereof, fine brass chips C are dumped into a bin 20 from which they feed by gravity through a hopper 22 onto a conveyor 24. The latter transfers the chips to a generally circular bin or bowl 26 forming part of a vertical conveyor 28. Projecting axially upward from the center of bowl 26 in a series of helical flights 27 which carry the chips upwardly from the bowl and discharge them into the hopper of a magnetic separator 30, the drive unit for which is indicated at 32. After passing through the separator, the chips are delivered onto a generally horizontal conveyor 34 by which they are then introduced into the crucible 37 of a melting furnace 36. Conveyor 34 has a forward extension 38 overlying the open upper surface of the furnace, which extension helps to distribute the chips uniformly across that surface. A mechanically actuated rabble or pusher 40, positioned centrally above the open crucible, is supported by a shaft or column 42 depending from an overhead cantilever beam 44 forming part of apparatus 46 for reciprocating pusher 40 vertically toward and away from the surface of the molten metal in the crucible. Conveyor extension 38 is specially contoured to allow shaft 42 of pusher head 40 to extend upwardly, axially of the crucible of furnace 36. The pusher apparatus 46 is arranged not only to impart vertical reciprocation to pusher head 40 but also to rotate the head in a horizontal plane within angular limits as shown in dotted lines in FIG. 2. It is not desired that the pusher 40 come into actual contact with the molten metal itself, and its lower limit of reciprocation is accordingly adjusted to prevent this. At its uppermost position, pusher 40 is raised sufficiently above the surface of the melt in the crucible to allow incoming chips to be distributed evenly across the entire exposed surface of the crucible.

As previously mentioned, the upper surface of the furnace crucible is completely covered by a thick blanket B (see FIG. 3) composed of granular carbon particles of small diameter. In present commercial practice, blanket B is maintained at a minimum thickness of about 4 inches, and 6 inches or more is preferable, to provide at the surface of the molten metal a zone of fluid-like medium which is highly reducing in nature. The chips are thus introduced into a protective medium on the surface of the molten metal in the furnace in such manner that they are received below their oxidation temperature and are heated by intimate contact with the fluid-like medium under conditions which prevent oxidation while being raised through such contact to their melting temperature. As already explained, the composition of this blanket of carbon granules is such that, under operating conditions, it is very "fluid," offering minimum resistance to the passage therethrough of the fine metal chips while at the same time effectively excluding access of air both to the upper surface of the melt in the furnace and to the chips themselves in the zone directly above the furnace where they are subjected to the intense heat of the molten metal immediately prior to coming into contact therewith. Furnace 36 is equipped with an underpour overflow feed spout 50 which serves to draw off molten metal from below the surface thereof in the crucible and maintains the level of the melt in the furnace substantially constant. This molten metal by more or less continuous overflow through spout 50 without tilting of melt furnace 36 is delivered by a launder 52 to a second furnace 54, hereinafter termed the hold or pour furnace, which is substantially similar to crucible furnace 36. In this case, however, furnace 54 is mounted on trunnions 56 whose axis passes substantially through the lip 58 of the pour furnace, whereby tilting of the furnace causes metal to flow over the lip into a strainer or tundish 60 having a chute to deliver the molten metal to the cavity of a billet mold 62. The billets I (FIG. 1), when cooled, are removed from mold 62 and are lowered by a hoist 63 onto a conveyor 64 for delivery to skids 66 for temporary storage.

In practicing the invention, optimum results are obtained by careful control of the rate of feed of the chips to melt furnace 36, so that the instantaneous rate of delivery of the chips to the furnace is held as closely equal to the instantaneous capacity of the furnace to melt the chips as is practical to achieve. This capacity of the furnace is determined from moment to moment by the temperature of the molten metal in the melting furnace crucible, and the furnace is equipped with a thermocouple installation 68 which is employed for determining this. The electrical signal produced by this thermocouple is fed to a conventional proportional electronic control device 70 which in turn controls the several drive units for the conveyors employed in feeding the chips from the bin to the furnace, whereby the rate of feed of the chips is continuously regulated in accordance with the temperature of the molten metal in the furnace.

With the foregoing perspective in mind of the general steps involved in practicing the invention, a further detailed description of the individual steps, and of the particular apparatus here illustrated for accomplishing the steps, will now be given.

Figure 8:
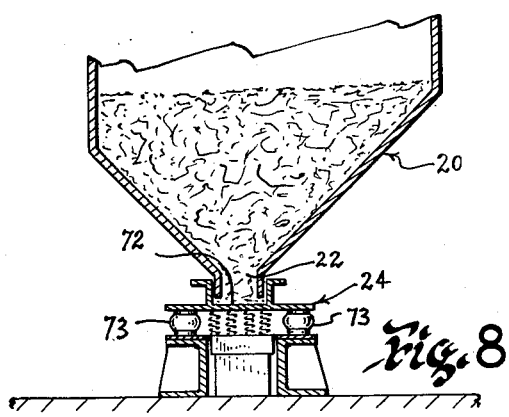
FIG. 8 is a sectional view in end elevation on line 8—8 of FIG. 1 showing portions of the chip bin and feed mechanism.

Referring to FIGS. 1, 2 and 8 of the drawings, the brass chips C flow downwardly from bin 20 to an open hopper 22 where they are deposited onto chute 72 forming the load carrying member of conveyor 24. Transport of the chips along chute 72 is effected by oscillating or vibrating the chute rapidly through a cycle comprising limited forward and upward movement and return, whereby forward momentum is imparted to the chips on the chute. Resilient mounting means 73 for the chute permits its oscillatory motion in this manner. There is a certain range of frequencies or speed of vibration in which substantial synchronism with the natural period of vibration of the chips is achieved, whereby by varying the frequency of vibration of the chute within this range, the rate of progress of the chips along the chute can be accurately controlled. Motive means (not shown) are provided for producing this vibration and controlling its frequency. Apparatus of this type is well known, and is available commercially.

Chips C are thus transferred from hopper 20 and delivered to the helical conveyor feed bowl 26. Here the chips are deposited onto a grizzly 74 of roughly U-shaped configuration (see FIG. 2) consisting of closely spaced parallel bars forming a rough grate through which the fine chips are free to fall while long curled chips, commonly referred to as "hay," are temporarily retained. Separation of the "hay" is desired as this tends to clog the even flow of chips to the furnace, and this type of scraps, because of its greater weight, does not present as difficult a melting problem as the fine chips and can therefore be separately introduced into a furnace in conventional manner with little difficulty. Grizzly 74 is mounted directly on bowl 26, and both the bowl and the helical flights 27 of conveyor 28 are mounted for gyratory reciprocation whereby both are angularly reciprocated back and forth about the axis of the helix in short rapid strokes which also have a vertical component. By reason of the mounting of grizzly 74 integrally on bowl 26, the grizzly is also rapidly oscillated and causes any accumulated "hay" and oversize scrap to progress along the course of the grizzly, in counterclockwise direction as viewed in FIG. 2, to be finally discharged into a portable bin or collection cart 75.

Feed of chips C from bin 20 to the spiral conveyor bowl 26 is controlled automatically by the level of the chips in the bowl. For this purpose, the bowl is provided with paired sets of insulated electrodes spaced about its circumference. As seen in FIG. 6, four sets of electrodes are used, comprising two lower sets 166 and two upper sets 168. Whenever the level of chips in bowl 26 drops below the level of both sets of lower electrodes 166, a circuit is completed to the motor of conveyor 24 causing it to operate to feed more chips to bowl 26. This continues until the chips reach the level of the paired contacts of an upper set of electrodes 168, providing conduction by means of the chips themselves between paired contacts of such set. When this occurs, the motor circuit for conveyor 24 is interrupted. The respective upper and lower sets of electrodes are connected in electrical parallel, and multiple sets are used simply for safety reasons.

Helical conveyor 28 operates on substantially the same principle as conveyor 24 in that the frequency of the stroke and the pitch of the helices of flights 27 are so coordinated that the chips tend to jump forwardly and upwardly from bowl 26 along the helical path defined by the flights 27, finally arriving at discharge point 80 at the upper end of the conveyor. The delivery of chips from bowl 26 to the upper dicharge point 80 can thus be regulated by the speed of oscillation or vibration of conveyor 28. A variable speed drive unit 82 (see FIG. 2) effects this, and the speed of this drive unit is made responsive to proportional control device 70.

Upon delivery of the chips to the magnetic separator 32, iron and other magnetic inclusions are picked up on a magnetic drum (not shown) and carried to a discharge point where they are removed and pass down through a chute 84 for delivery to a scrap cart or other suitable collection device.

The brass chips emerging from magnetic separator 32 are then deposited on the load-carrying surface 86 of conveyor 34. This conveyor is also of the vibratory type and is substantially identical in construction and operation with chip bin conveyor 24 already described.

The chips progress along conveyor 34 and onto its forward extension or apron 38 (FIGS. 2 and 5) which distributes them over the exposed surface of the crucible furnace 36. Here they drop into blanket B of carbonaceous particles and are enveloped by it, being able to sink rapidly into it by reason of its highly fluid nature. The optimum initial particle size of the blanket material has been discussed hereinbefore and is desirably less than that of the chips themselves, being on the order of one thirty-second of an inch in diameter. The apparent specific gravity of the carbonaceous material in blanket B under the conditions existing in the furnace is desirably somewhat less than that of the chips, to facilitate the sinking of the chips therethrough. A carbonaceous material meeting these requirements is available commercially under the trade name "Micronex" which is a type of channel carbon black marketed in dust-free bead form by Binney & Smith Co., New York, N.Y., "Statex-R", manufactured by Southern Carbon Co., Monroe, La., is another suitable material.

Figure 7:
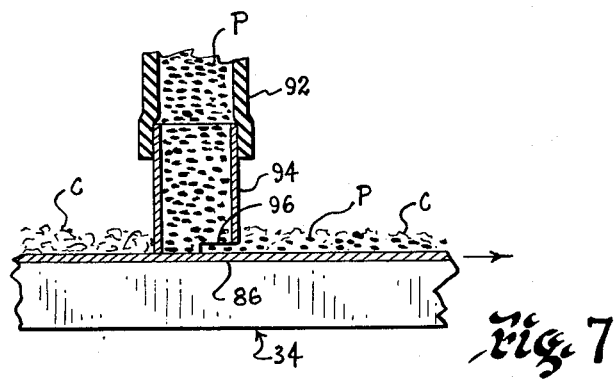
FIG. 7 is a fragmentary view in side elevation, partly in section, of conveyor means for feeding chips to the melt furnace and cooperating means feeding carbonaceous material along with the chips to replace that consumed in the melting operation.

As some of the carbon is of course consumed in the furnace, it must be replaced to maintain the desired thickness of the blanket. This may be readily accomplished by continuously feeding the carbon pellets P into the furnace along with metal chips, and one arrangement for this is illustrated in FIGS. 1, 2 and in greater detail in FIG. 7. Thus, a supply of the pellets P is held in hopper 90 (FIGS. 1 and 2) from which they feed by gravity through a flexible duct 92 to a distributing nozzle 94 mounted adjacent the surface 86 of conveyor 34. Nozzle 94 is formed of a short length of metal tubing abutting against the surface 86 of the conveyor and having a notch 96 cut at the downstream side to allow the pellets to feed into admixture with the chips on conveyor surface 86 as the latter vibrates. The rate of feed of the pellets can be adjusted as needed simply by changing the size of notch 96.

The arrangement shown more particularly in FIG. 1 for effecting reciprocation of the pusher 40 is so designed as to enable most of the components to be placed out of the zone of high temperature existing directly above the furnace 36. This simplifies bearing design and lubrication problems, as well as making fewer obstructions to a hood and flue above the furnace for carrying off excess heat and fumes. To this end, pusher head 40 is supported on a shaft 42 depending from a cantilever arm 44 which, in turn, is supported on a reciprocated column 100 disposed laterally of furnace 36. Column 100 is supported for vertical reciprocation in a cylinder 102 carried by a pair of radial arms 104 secured at their inner ends to a vertically disposed axle 106. The latter is journaled in bearings 108, 110, at its upper and lower ends, respectively, directly below and concentric with the axis of furnace 36. Cylinder 102 is apertured at 112 to permit access to the reciprocating column 100 therewithin, and one end of a lever 114 is pivotally attached at 116 to column 100. The other end of lever 114 is piovtally secured to axle 106 by means of a pin-and-slot arrangement 118 providing a lost-motion connection. Intermediate the ends of lever 114 and the lower radial arm 104 of assembly 46 there is interposed a pneumatic or hydraulic actuator 120, one end of which is pivotally connected at 122 to the lower radial arm 104 while its operating ram 124 is pivotally secured at 126 to lever 114. Fluid pressure supplied through conduits 128 effects extension and retraction of the operating ram 124 of actuator 120, thereby producing vertical reciprocation of column 100 and pusher head 40.

The initial setting of the pusher head and the length of its stroke are so adjusted as to avoid contact of the head with the molten metal in the furnace at the bottom of its stroke, while at the top of its stroke the pusher is preferably lifted slightly above the surface of the blanket to facilitate even distribution of incoming chips across the blanket.

Means is also provided for angularly or rotatively moving the pusher assembly about its axis, and as shown in FIG. 2 this comprises a second actuator 130. Operating ram 132 of this actuator is connected to cylinder 102, while the opposite end is fastened to a stationary frame member 134. Both ends of the actuator are pivotally connected at their respective points so that extension and retraction of the operating ram 132 causes pusher assembly 46 to swing about its axle 106, as shown in dotted lines in FIG. 2. In this manner push head 40 can be angularly displaced so that the paddles or blades contact the carbonaceous blanket B at different points in its surface. In the drawings and more particularly in FIG. 5, the pusher head 40 is shown as having four paddles or blades 136 which radiate outwardly from a hub 138. Each of paddles 136 is of generally sectorial configuration as viewed in plan, and is of a size such that rotations of shaft 42 through 45° effects an overlap of the area covered by the undersurface of the paddles, whereby the entire surface of the furnace may be covered by the pusher in successive steps of angular adjustment.

In order that the pusher 40 can be reciprocated rapidly without causing disruption of the blanket B to the extent that air is admitted to the surface of the molten metal, while at the same time assuring effective poking of the chips into the blanket, the under surface of paddles 136 is made comparatively flat and the upper surface is hipped or roof-shaped, as seen best in FIG. 3. This provides good action in submerging the chips in the blanket, while the hipped upper surface of the paddles prevents accumulation thereon of incoming chips or excessive drag-out of the chips and associated carbon blanket during its upward stroke.

In general, it has been found desirable to operate the pusher at a speed of around five to fifteen cycles per minute. The angular rotation of the pusher is not critical and may in some cases be omitted. Where it is employed, completion of the movement of the blade through its complete displacement and return may typically be on the order of once or twice a minute. This angular displacement may be accomplished completely in one or two strokes of the pusher, or it may be done more gradually in smaller increments over a greater number of vertical reciprocations. The amount of angular displacement need, of course, be no more than that necessary to bring the paddles into contact with all portions of the blanket surface. Where there are four paddles as shown in the drawings, each of which has an angular width of 45°, displacement of 45° will effect the foregoing result. A different number of paddles or different widths will of course require correspondingly different amounts of angular movement to cover the entire surface.

Without limiting the invention to the following explanation of what apparently occurs, the action of the pusher head on the chips and carbonaceous blanket in the furnace may be described somewhat as follows: When the pusher head is given its downward stroke to bring it into contact with and submersion in blanket B, substantially three things take place. First, much of the portion of blanket B immediately below each paddle blade 136, together with the entrained chips in this portion, is depressed by the flat undersurfaces of the blades, causing a surge of molten metal to flow off through overflow spout 50 of the furnace. Simultaneously, the body of molten metal in the furnace directly below each pusher blade tends to penetrate into the adjacent portion of the blanket and thereby to wet and assimilate the heated and entrained chips in that portion. And thirdly, the portion of the blanket in the "free" areas between blades 136 rises about the blades. Due to the fluidity of the blanket and the speed of pusher 40, this last mentioned portion of blanket B goes through a churning ebullient action aiding in the complete envelopment and commingling of the chips deposited just previously in these areas, thus effecting a better rate of heat transfer between the blanket and the chips.

The furnace 36 employed for melting the chips is of standard low-frequency electric induction heating type having a crucible 37 in the lower portion of which is formed a loop or channel 140 passing around one leg of a magnetic core 142. Molten metal in this loop acts as the secondary of a transformer, the primary of which is provided by an induction coil 144 mounted on a leg of the core within the lower portion of the furnace, all in well known manner. Ducts 146 and a housing 148 provided on the underside of the furnace direct cooling air to the core. Electrical energy supplied to coil 144 produces high induced currents in the molten metal in loop 140, thereby keeping it molten and serving to cause it to circulate through the channel, whereby a substantially uniform temperature gradient in the molten mass of metal is maintained throughout the furnace.

Supply of current to coil 144 is controlled by proportioning device 70 in response to the temperature indication received from thermocouple 150 positioned within the thermocouple tube 68. This tubing is made of special alloy steel to withstand the high temperature in the furnace, and cooling air is forced through the upper portion of the tubing by introduction at leg 153. This cooling air is allowed simply to exhaust out of the upper end of tubing 68 around the thermocouple leads 151 which are brought out at that point and run to control device 70.

The melting furnace is also provided with an underpour spout 50, as previously mentioned, designed to maintain a constant level of the molten metal in the furnace. Spout 50 is formed of special high temperature resistant alloy steel similar to that used in thermocouple ducting 68. The lower end of pour spout 50 is disposed below the surface of the molten metal to avoid inclusion of portions of the carbonaceous blanket or more importantly of any particles of unmelted, undissolved iron, as previously mentioned. Molten metal normally passes out through the overflow arm 151 of the spout as the level in the crucible tends to rise with melting of chips as they are added to the furnace. The overflow metal passes through leg 152 of the spout into a heated launder 52 and then into the hold furnace 54. As shown in FIGS. 1 and 3, spout 50 is also provided with a clean-out extension 154 through which a curved pusher may be run in case the metal tends to congeal and block the overflow.

Hold furnace 54 is an induction furnace essentially similar to melting furnace 36 but is mounted for tilting movement to enable metal to be poured off, whereas the melt furnace 36 does not tilt. This tilting arrangement is desirable and conventional with pouring furnaces since the rate at which molten metal is poured into a billet mold is important in producing a billet of uniform, dense section throughout its length. Since the desired rate of pouring into a mold is generally different from the rate of melting the chips in furnace 36, hold furnace 54 acts as a temporary reservoir or accumulator until sufficient molten metal is available to pour a full billet at a constant predetermined rate of pour. At such time, the pour furnace is tilted by actuation of operating ram 156 of hydraulic or pneumatic cylinder 158 (see FIG. 4).

As in the melt furnace, it is likewise desirable in the pour furnace to maintain an overlying blanket B' of carbonaceous material to prevent formation of excess dross on the surface of the melt. In this case the blanket need not be as thick as in the chip melting furnace, and usually three or four inches is ample. A dam 160 adjacent the pour spout may be used to retain the blanket on the surface of the melt while the furnace is tipped to pour metal into a mold.

The pour furnace may also be employed to melt heavier scrap stock in the form of chunks or the like which can be introduced automatically or manually. In this respect, the hold furnace is used in the presently conventional manner of melting scrap where, because of the greater weight of this type of scrap, getting the scrap quickly into the mass of molten metal before substantial oxidation occurs presents no significant problem. Thus double use of the hold furnace, i.e., for accumulating molten metal from the chip melting furnace and simultaneously melting heavier scrap, provides an integrated system capable of accepting all types of scrap.

From the pour furnace, the molten metal passes through a strainer 60 into the billet molds 62 (FIG. 1), as previously described, where it is allowed to cool. After the billet is cooled, the mold, which is of the split type and hinged along one side, is opened to expose the billet which can then be lifted by hoist 63 and placed on a lowering conveyor 64 for deposit on skids 66.

The temperature normally to be maintained both in the melt furnace 36 and pour furnace 54 is one which is sufficiently high to maintain the metal in quite fluid condition but which, in the case of brass, is not so high as to cause excessive volatilization of the zinc content. In typical chip brass, the melting temperature is on the order of 1630 to 1650° F. Zinc begins to boil at around 1950° F. Furnace temperatures between these limits are suitable but improved performance and increased rate of production are obtained as the average temperature in the melt is raised to something approaching the high limit.

As previously mentioned, optimum benefits of the invention are obtained by continuous operation of the melting furnace at full capacity, and by automatically controlling the feed of chips in accordance with the temperature of the melt in the furnace so that the rate of chip feed is equal at all times to the instantaneous capacity or ability of the furnace to absorb the chips practically as fast as they are added. In speaking of rates of melting here, it will be understood that it is essential to control the operation much more closely than simply providing an overall desired rate of processing the chips. For example, if the mean melting rate of a given furnace is 3600 pounds per hour, it would be fatal to the success of the method herein disclosed to charge 3600 pound lots all at once at one hour intervals, or even 600 pound charges at ten minute intervals. Even 60 pound charges at one minute intervals would not represent good practice. It would be much better to add ten pounds every ten seconds and actually one pound every second is better still and quite practically achieved in the method here proposed.

The invention, however, is not limited in its broader aspects to operation under optimum conditions, and reasonable deviation is possible with quite satisfactory results so long as the basic principles heretofore described are observed. That is, the invention lies in the concept of introducing the fine metal chips into a melt thereof maintained in a furnace at a feed rate approximately equal to the instantaneous capacity of the furnace to absorb the incoming chips, while providing on the surface of the melt a protective fluid-like medium of finely divided carbonaceous material to effect a strongly reducing atmosphere blanketing the melt surface and extending above it sufficiently to enable incoming chips to be introduced therein below their oxidation temperature, mechanically effecting such intimate contact of the chips with the carbonaceous medium as to prevent oxidation of the chips while they are heated by such contact to their melting temperature and become absorbed in the mass of molten metal in the furnace, and simultaneously withdrawing molten metal from the furnace at a rate such that the level of the melt therein remains virtually constant.

What is claimed is:

1. The method of melting fine brass chip scrap which comprises the steps of maintaining a melt of brass in the crucible of a furnace, providing across the surface of said melt a carbonaceous blanket constituting a zone of highly reducing character, said blanket comprising carbonaceous particles sufficiently finely divided to impart at the operating temperature of the furnace a fluid-like consistency to said blanket, said blanket having a thickness of at least about 4 inches above the surface of said melt, introducing the brass chips into the furnace by distributing them substantially uniformly across the surface of said blanket while the chips are at a temperature below that at which substantial surface oxidation can occur, passing the chips so introduced through said blanket to promote intimate contact therewith, and withdrawing metal from said crucible at a rate sufficient to maintain the surface level of said melt substantially constant.

2. The method as defined in claim 1, which also includes the step of poking said carbonaceous blanket with mechanical means by reciprocating said means transversely of said blanket to effect envelopment of the chips by said blanket.

3. The method as defined in claim 1, wherein the carbonaceous matter making up said blanket in said furnace is added concurrently with the metal chips fed to the furnace.

4. The method as defined in claim 1, wherein said carbonaceous matter comprising said blanket is pelletized carbon in which the individual pellets have a maximum diameter of about one thirty-second of an inch when introduced into the furnace.

5. The method of converting to usable form readily oxidizable metal scrap in finely divided chip form by melting such scrap and casting it into billets, which comprises the steps of collecting said scrap at a storage point, feeding the scrap from said point to a melting furnace by variable speed conveyor means, maintaining a body of reclaimed metal in molten condition in the crucible of the melt furnace, providing across the surface of said melt a carbonaceous blanket constituting a zone of highly reducing character, said blanket comprising carbonaceous particles sufficiently finely divided to impart at the operating temperature of the furnace a fluid-like consistency to said blanket, said blanket having a thickness of at least about 4 inches above the surface of said melt, introducing said metal chips into said furnace by distributing them substantially uniformly across the surface of said blanket and assisting the envelopment of the chips therein by mechanically poking them downward through said blanket, varying the speed of the conveyor to provide a rate of chip feed substantially equal to the instantaneous capacity of the furnace to melt the incoming chips, and continuously withdrawing molten metal from the furnace to maintain the level thereof substantially constant in said furnace.

6. The method as defined in claim 5, wherein the energy input to said melt furnace for melting said metal is maintained substantially constant at the maximum operating capacity of said furnace.

7. The method as defined in claim 6, wherein the rate of feed of said chips to said furnace is controlled by temperature means responsive to the temperature of the body of the molten metal in said furnace.

8. The method of melting brass scrap in finely divided chip form, which comprises the steps of feeding the scrap to a melting furnace by variable speed conveyor means, maintaining a body of brass in molten condition in the melting furnace and providing across the surface thereof a blanket of finely divided pelletized carbon particles, the maximum size of such particles being roughly one thirty-second of an inch in diameter when introduced into said furnace and said blanket having a minimum thickness of about four inches, continuously introducing said brass chips into said furnace by distributing them substantially uniformly across said blanket of carbon particles and assisting the chips to pass downwardly through and be enveloped by the blanket by mechanically poking them into said blanket, varying the feed rate of said conveyor means so that the rate of delivery of the chips to the furnace is substantially equal to the instantaneous rate of their absorption into the melt, and continuously withdrawing molten metal from the furnace by underpouring from beneath the surface thereof to maintain the level of molten metal therein substantially constant.

9. The method as defined in claim 8, wherein the mechanical poking of the chips is effected by vertical reciprocation of plunger means contacting said blanket but held out of contact with the molten metal in the furnace.

10. In the conversion of fine brass chip scrap to billet form by remelting said scrap and casting the recovered metal into billet molds, the method which comprises maintaining the crucible portion of an inductively heated furnace full of molten brass at a temperature between its melting point and about 1950° F., by distributing said chips substantially uniformly across the open face of the crucible while simultaneously withdrawing molten brass from beneath the surface thereof, energizing the furnace continuously at substantially its maximum capacity, providing across the surface of the molten brass a carbonaceous blanket constituting a zone of highly reducing character, said blanket comprising carbonaceous particles sufficiently finely divided to impart at the operating temperature of the furnace a fluid-like consistency to said blanket, said blanket having a thickness of at least about 4 inches above the surface of the molten metal, controlling the rate of feed of said brass chips to said furnace by means responsive to the temperature of the molten brass in said crucible to maintain the instantaneous rate of feed of said chips to said crucible substantially equal at all times to the instantaneous rate of absorption of the chips previously heated by said molten bath and constantly rabbling said protective blanket to insure rapid, intimate commingling of chips with said heated carbonaceous blanket.

11. The method defined in claim 10, which includes maintaining said melt furnace upright and removing molten metal therefrom by underpouring through a submerged inlet overflow pipe to maintain the level of molten metal substantially constant in said furnace, receiving such removed metal in a separate, tiltable holding furnace until sufficient metal is accumulated to pour a full billet mold, and then tilting said holding furnace to cast a full billet.

References Cited in the file of this patent

UNITED STATES PATENTS

| | | |
|---|---|---|
| 334,207 | Wetherill | Jan. 12, 1886 |
| 2,065,207 | Betterton | Dec. 22, 1936 |
| 2,092,595 | Spowers | Sept. 7, 1937 |
| 2,446,637 | Crampton et al. | Aug. 10, 1948 |
| 2,793,852 | Harrison | May 28, 1957 |

FOREIGN PATENTS

| | | |
|---|---|---|
| 919,266 | France | Nov. 18, 1946 |